(12) United States Patent
Kominami et al.

(10) Patent No.: US 6,577,066 B1
(45) Date of Patent: Jun. 10, 2003

(54) COMPACT SELF-BALLASTED FLUORESCENT LAMP

(75) Inventors: Satoshi Kominami, Katano (JP); Kouji Miyazaki, Hirakata (JP); Mamoru Takeda, Soraku-gun (JP); Takayuki Imai, Ibaraki (JP); Masayoshi Gyoten, Otsu (JP); Masanobu Murakami, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/937,953

(22) PCT Filed: Mar. 30, 2000

(86) PCT No.: PCT/JP00/02054

§ 371 (c)(1),
(2), (4) Date: Nov. 13, 2001

(87) PCT Pub. No.: WO00/58997

PCT Pub. Date: Oct. 5, 2000

(30) Foreign Application Priority Data

Mar. 30, 1999 (JP) .......................... 11-088714

(51) Int. Cl.$^7$ ................................ H01J 13/46
(52) U.S. Cl. ................ 315/58; 315/61; 315/307; 315/209 R; 315/DIG. 7
(58) Field of Search .................... 315/56, 58, 61, 315/63, 209 R, 291, 307, 244, 127, DIG. 7, DIG. 5; 362/260, 368

(56) References Cited

U.S. PATENT DOCUMENTS 5,315,214 A * 5/1994 Lesea .................... 315/209 R
5,767,631 A * 6/1998 Konopka et al. ............ 315/127
6,211,623 B1 * 4/2001 Wilhelm et al. ............. 315/224
6,252,357 B1 * 6/2001 Tanaka et al. ........... 315/209 R
6,437,502 B1 * 8/2002 Nishio et al. ............... 313/493

FOREIGN PATENT DOCUMENTS

| JP | 63-245803 | 10/1988 |
| JP | 03-219596 | 9/1991 |
| JP | 7-85708 | 3/1995 |
| JP | 7-176202 | 7/1995 |
| JP | 11-025751 | 1/1999 |
| JP | 11-67149 | 3/1999 |
| JP | 2000-21351 | 1/2000 |

OTHER PUBLICATIONS

Copy of Japanese Office Action from the corresponding Japanese Patent Application 2000–608408, dated Feb. 4, 2002.

* cited by examiner

Primary Examiner—Haissa Philogene
(74) Attorney, Agent, or Firm—Snell & Wilmer, LLP

(57) ABSTRACT

A self-ballasted fluorescent lamp 50 includes a fluorescent lamp 1 and a ballast circuit 2 for operating the fluorescent lamp. The ballast circuit 2 includes: a printed circuit board 6; a heat generating component 7 disposed on a first face 6a of the printed circuit board, which generates heat when the fluorescent lamp 1 is operated; and a semiconductor component 17 disposed on a second face 6b opposite to the first face 6a of the printed circuit board 6, and wherein the semiconductor component 17 is disposed in an area other than an area on the second face 6b corresponding to an area of the first face 6a where the heat generating component 7 is disposed.

5 Claims, 5 Drawing Sheets

COMPACT SELF-BALLASTED FLUORESCENT LAMP

TECHNICAL FIELD

The present invention relates to a self-ballasted fluorescent lamp including a fluorescent lamp and a ballast circuit for operating the fluorescent lamp.

BACKGROUND ART

The self-ballasted fluorescent lamp includes a screw-shell (e.g., an E26-type screw-shell) which is interchangeable with that of an incandescent lamp. Thus, the self-ballasted fluorescent lamp can be screwed Into a socket for the incandescent lamp for its use. The self-ballasted fluorescent lamp has a structure in which the fluorescent lamp and the ballast circuit are integrated.

The self-ballasted fluorescent lamp has superior features, in comparison to the incandescent lamp, in that the self-ballasted fluorescent lamp has about one-third power consumption and about six-fold life span. Therefore, fin recent years, the self-ballasted fluorescent lamp is rapidly coming into wide use as an energy-saving type of a light source instead of the incandescent lamps.

As the ballast circuit of the self-ballasted fluorescent lamp, a high-frequency inverter circuit is generally used in order to make the entire self-ballasted fluorescent lamp small in size and light in weight.

The ballast circuit of the self-ballasted fluorescent lamp includes a printed circuit board and circuit components disposed on the printed circuit board. A positional arrangement of the circuit components on the printed circuit board is determined, in consideration of electrical circuit design, such that the self-ballasted fluorescent lamp can be small in size by effectively utilizing space in a case for containing the ballast circuit.

Japanese Utility Model Publication for Opposition No. 63-4331 discloses an example of a positional arrangement of circuit components. According to Japanese Utility Model Publication for Opposition No. 63-4331, a component having a maximum mounting height among the circuit components is disposed at the center of a printed circuit board. The circuit components having the other mounting height are disposed around the component having the maximum mounting height toward the circumference of the printed circuit board in order of the height of the mounting height of the other components. Thus, a small-sized ballast circuit is realized.

Japanese Utility Model Publication for Opposition No. 63-4331 does not mention that IC components are disposed on the printed circuit board. Accordingly, Japanese Utility Model Publication for Opposition No. 63-4331 does not take into account measures concerning heat for the case where the IC components are used.

An objective of the present invention is to provide a self-ballasted fluorescent lamp which is capable of reducing an adverse heat influence on IC components.

DISCLOSURE OF THE INVENTION

In order to achieve the above-described objective, a self-ballasted fluorescent lamp according to the present invention includes a fluorescent lamp and a ballast circuit for operating the fluorescent lamp, wherein the ballast circuit includes: a printed circuit board, a heat generating component disposed on a first face of the printed circuit board, which generates heat when the fluorescent lamp is operated, and a semiconductor component disposed on a second face opposite to the first face of the printed circuit board, and wherein the semiconductor component is disposed in an area other than an area on the second face corresponding to an area of the first face where the heat generating component is disposed, thereby achieving the above-described objective.

The semiconductor component may be an inverter driving IC included in an inverter circuit for operating the fluorescent lamp.

The inverter circuit may further include a first switching element driven by the inverter driving IC and a second switching element driven by the inverter driving IC, the heat generating component may be disposed in substantially a central area on the printed circuit board, and an area of the printed circuit board where the inverter driving IC is disposed may be located opposite to an area of the printed circuit board where the first and second switching elements are disposed with respect to the area where the heat generating component is disposed.

The inverter circuit may further include a first switching element driven by the inverter driving IC and a second switching element driven by the inverter driving IC, the heat generating component may be disposed on the printed circuit board in an area close to one end of the printed circuit board, the inverter driving IC and the first and second switching elements may be disposed on the printed circuit board in an area close to the other end of the printed circuit board.

The heat generating component may be a magnetic circuit component.

The semiconductor component may be disposed at a distance of at least 10 mm from a tube end in which an electrode of the fluorescent lamp is provided.

BEST MODE FOR CARRYING OUT THE INVENTION

Hereinafter, examples of the present invention will be described with reference to the drawings.

EXAMPLE 1

Figure 1:
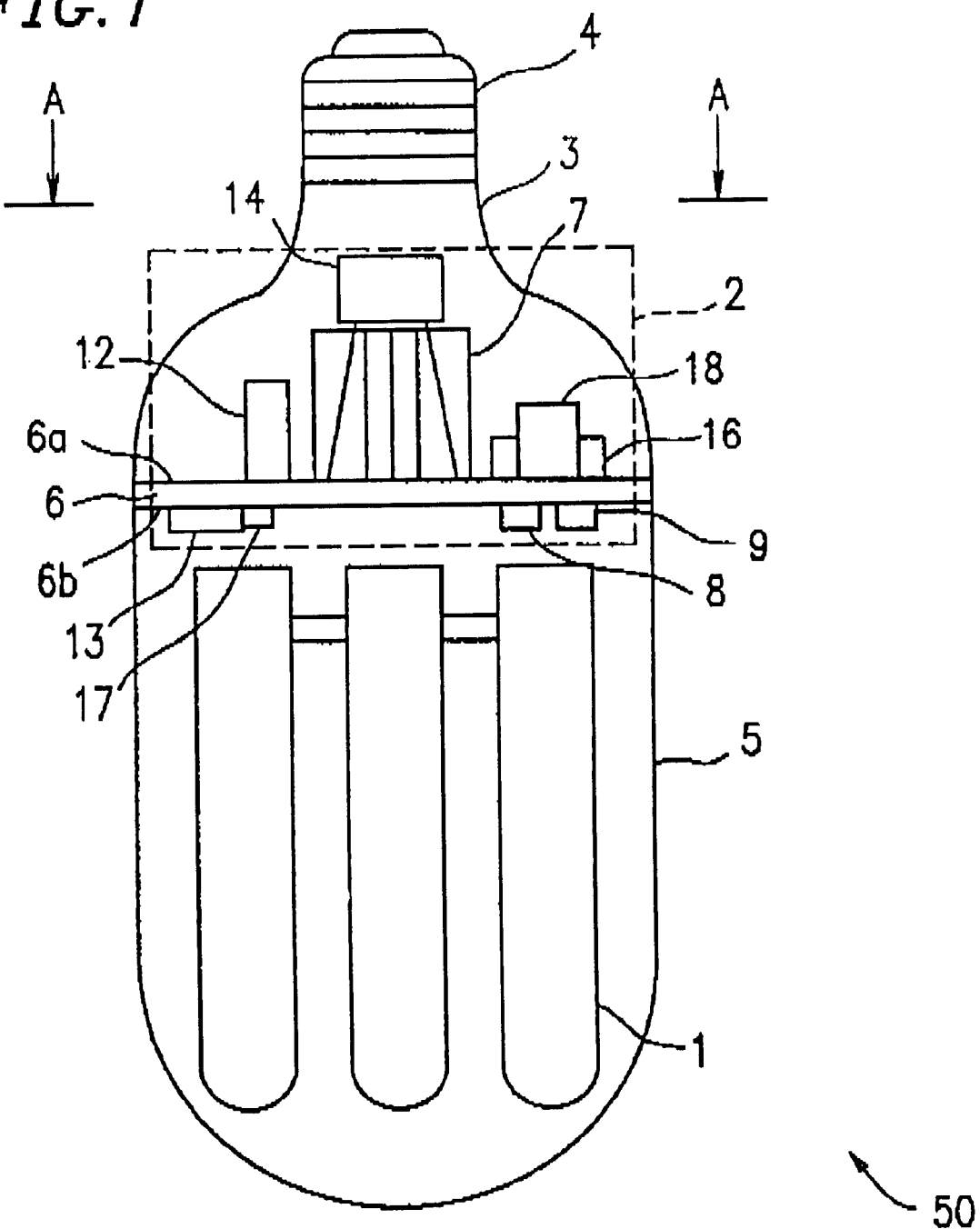
FIG. 1 is a side view illustrating a structure of a self-ballasted fluorescent lamp 50 according to Example 1 of the present invention.

FIG. 1 illustrates a structure of a self-ballasted fluorescent lamp 50 according to Example 1 of the present invention.

The self-ballasted fluorescent lamp 50 includes a fluorescent lamp 1 and a ballast circuit 2 for operating the fluorescent lamp 1.

The fluorescent lamp 1 is structured, for example, by connecting three discharge tubes which are substantially U-shaped by bridges.

The ballast circuit 2 includes a printed circuit board 6, at least one circuit component disposed on a first face 6a of the printed circuit board 6, and at least one circuit component disposed on a second face 6b of the printed circuit board 6. Here, the first face 6a of the printed circuit board 6 is defined as a face opposite to a face on which the fluorescent lamp 1 is provided and the second face 6b is defined as the same face on which the fluorescent lamp 1 is provided.

In the following description, the "first face" is referred to as a "front face" or an "upper face", and the "second face" is referred to as a "reverse face" or a "lower face", In an example shown in FIG. 1, the circuit components such as a choke coil 7 are disposed on the front face 6a of the printed circuit board 6, and the circuit components such as FETs 8 and 9 are disposed on the reverse face 6b of the printed circuit board 6.

A base 3 is formed to contain the ballast circuit 2 therein. A diffuser 5 having translucency is formed to cover the periphery of the fluorescent lamp 1.

The self-ballasted fluorescent lamp 50 is provided with a screw-shell 4 on one end. The screw-shell 4 is designed so as to be identical to a screw-shell for an incandescent lamp (e.g., an E26-type screw-shell for an incandescent lamp) in size and shape, and thus the self-ballasted fluorescent lamp 50 can be installed in light fittings (not shown) having a socket for an incandescent lamp.

The fluorescent lamp 1 is electrically connected to the ballast circuit 2, and the ballast circuit 2 is electrically connected to the screw-shell 4. When the self-ballasted fluorescent lamp 50 is installed in light fittings, the ballast circuit 2 is supplied with electric power from the light fittings vie the screw-shell 4. As a result, the fluorescent lamp 1 is operated.

Figure 2:
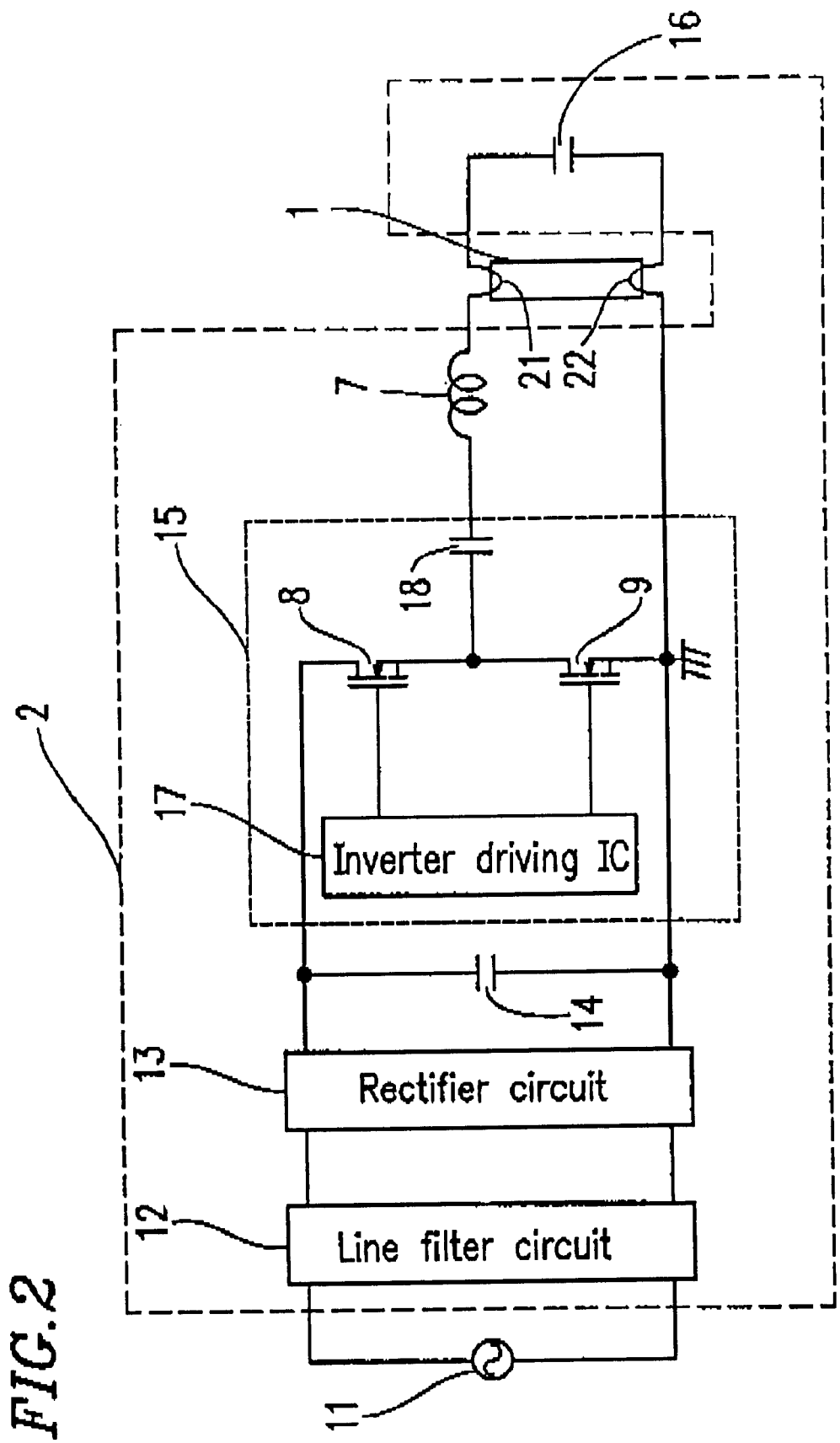
FIG. 2 is a circuit diagram of a ballast circuit 2 of the self-ballasted fluorescent lamp 50.

FIG. 2 illustrates a structure of the ballast circuit 2 of the self-ballasted fluorescent lamp 50.

The ballast circuit 2 includes a line filter circuit 12, a rectifier circuit 13, a power source smoothing capacitor 14, an inverter circuit 15, the choke coil 7, and a resonating capacitor 16. When the self-ballasted fluorescent lamp 50 in installed in light fittings, the line filter circuit 12 is supplied with electric power from a commercial power source 11.

The inverter circuit 15 is used for operating the fluorescent lamp 1 at a high frequency. By using the inverter circuit 15, the circuit components of the ballast circuit 2 can be small in size and light in weight.

The inverter circuit 15 includes an inverter driving IC 17, the FETs 8 and 9 driven by the inverter driving IC 17, and a capacitor for inverter 18. The FETs 8 and 9 are transistors which function as switching elements.

The inverter driving IC 17 is formed by integrating a circuits for driving the FETs 8 and 9. The integration of the circuits for driving the FETs 8 and 9 provides at least the following advantages (1) and (2).

(1) The design of a driving circuit which is compatible with various types of fluorescent lamps can be facilitated. For example, by changing external parts (e.g., a resistor or a capacitor) connected to the inverter driving IC 17, the realization of a driving circuit which is compatible with fluorescent lamps of various specifications (e.g., specifications of wattage, input voltages and frequencies) can be facilitated. As a result the production cost of the self-ballasted fluorescent lamp can be reduced.

(2) A small-sized self-ballasted fluorescent lamp having a dimming function can be realized. The dimming function refers to a function of adjusting a brightness of the fluorescent lamp. It is necessary to control a frequency at which the fluorescent lamp is operated in order to realize the dimming function. This is because there is a necessity of changing a current flowing to the fluorescent lamp by controlling a frequency. The fluorescent lamp is brightly operated when the current flowing to the fluorescent lamp is increased. The fluorescent lamp is dimly operated when the current flowing to the fluorescent lamp is decreased. The circuitry for controlling a frequency is highly complicated, and thus the circuitry can be large in scale if it is not formed as an integrated circuit. Accordingly, in order to make the self-ballasted fluorescent lamp having a dimming function small in size it is essential that the circuit for driving the FETs 8 and 9 is formed as an integrated circuit and a frequency control function is incorporated into such an IC.

From the above reasons, the self-ballasted fluorescent lamp 50 having the inverter driving IC 17 is regarded as the most likely next-generation self-ballasted fluorescent lamp.

A structure of the ballast circuit 2 is not limited to the structure shown in FIG. 2. The ballast circuit 2 can have any structure as long as it has a function of operating the fluorescent lamp 1. The operation of the ballast circuit 2 is well known and the description thereof will be omitted here.

The choke coil 7 in a magnetic circuit component used for restricting a current flowing to the fluorescent lamp 1. The choke coil 7 is a heat generating component which generates heat when the fluorescent lamp 1 is operated. While the fluorescent lamp 1 is operated, a temperature of the choke coil 7 reaches a high temperature of up to about 150° C. though the degree slightly varies due to conditions of an ambient temperature. As a result, a temperature of the reverse face 6b of the printed circuit board 6 also reaches about 150° C. in an area corresponding to an area on the front face 6a where the choke coil 7 is disposed.

The FETs 8 and 9 and the inverter driving IC 17 in the inverter circuit 15 are semiconductor components and have low heat resistance. A preferable operating temperature of the FETs 8 and 9 is 150° C. or lower at absolute maximum ratings. A preferable operating temperature of the inverter driving IC is 125° C. or lower. Accordingly, in order to improve reliability of the self-ballasted fluorescent lamp 50, it is necessary to dispose these semiconductor components in positions which are least likely to be affected by heat from the heat generating component.

Figure 3:
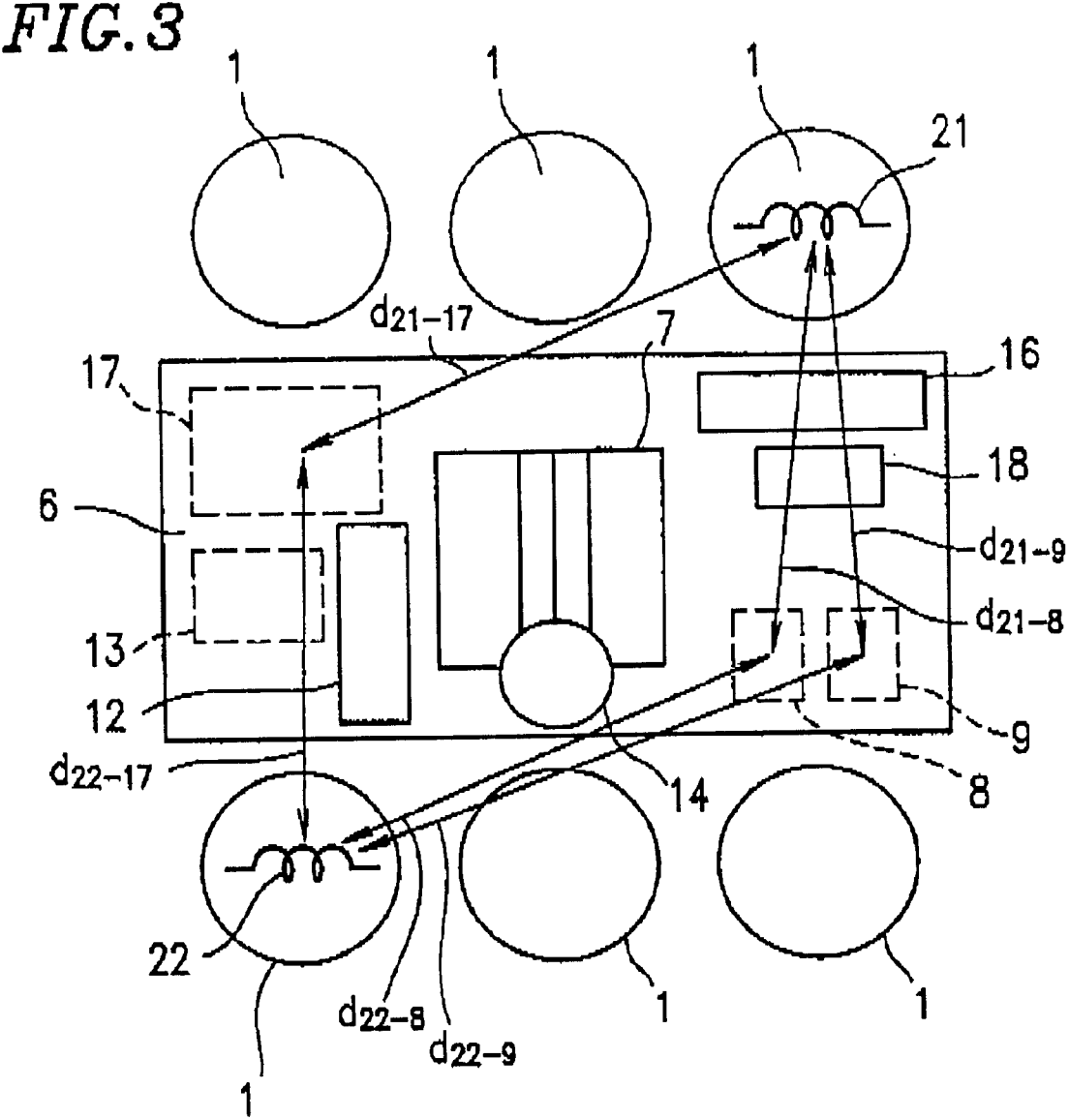
FIG. 3 is a plan view illustrating an example of a positional arrangement of circuit components on a printed circuit board 6.

FIG. 3 illustrates a positional arrangement of the circuit components disposed on the printed circuit board 6 of the self-ballasted fluorescent lamp 50. FIG. 3 a view of the printed circuit board 6 which is seen in a direction denoted by A in FIG. 1. Illustrations of the base 3 and the diffuser 5 are omitted in FIG. 3.

In FIG. 3, circuit components represented by the solid lines are disposed on the upper face 6a of the printed circuit board 6 and circuit components represented by the broken lines are disposed on the lower face 6b of the printed circuit board 6.

In the example shown in FIG. 3, the choke coil 7, which is a heat generating component, is disposed in a substantial central area on the upper face 6a of the printed circuit board 6. The FETs 8 and 9 and the inverter driving IC 17, which are semiconductor components, are disposed on the lower face 6b of the printed circuit board 6.

The FETs 8 and 9 and the inverter driving IC 17 are disposed in areas other than an area on the lower face 6b corresponding to an area on the upper face 6a where the choke coil 7 is disposed. Moreover, the area where the FETs 8 and 9 are disposed is located opposite to the area where the inverter driving IC 17 is disposed with respect to the area where the choke coil 7 is disposed. In the example shown in FIG. 3, the FETs 8 and 9 are disposed on the printed circuit board 6 in an area close to one end of the printed circuit board 6 and the inverter driving IC 17 is disposed on the printed circuit board 6 in an area close to the other end of the printed circuit board 6.

In this manner, by disposing the FETs 8 and 9 and the inverter driving IC 17 which are heat-sensitive semiconductor components positionally away from the choke coil 7 which is a heat generating component, an influence of heat generated by the choke coil 7 on the FETs 8 and 9 and the inverter driving IC 17 can be kept to a minimum.

Although the FETs 8 and 9 are heat-sensitive semiconductor components, the FETs 8 and 9 in themselves have the property of generating heat. Although the quantity of heat generated by the FETs 8 and 9 is much smaller than the quantity of heat generated by the choke coil 7, an influence of the heat generated by the FETs 8 and 9 on the inverter driving IC 17 cannot be ignored. This is because a temperature of heat which the inverter driving IC 17 can resist is lower than a temperature of heat which the FETs 8 and 9 can resist, and thus the inverter driving IC 17 is easily affected by the generated heat. As described above, by disposing the inverter driving IC 17 positionally away from the FETs 8 and 9, an influence of the heat generated by the FETs 8 and 9 on the inverter driving IC 17 can be kept to a minimum.

As described above, the inverter driving IC 17 is affected by heat more easily than the FETs 8 and 9 are. Therefore, there is a greater necessity for preventing an adverse heat influence on the inverter driving IC 17 than an adverse heat influence on the FETs 8 and 9. Accordingly when disposing the circuit components on the printed circuit board 6, a proper disposition of the inverter driving IC 17 is more important than that of the FETs 8 and 9. The inverter driving IC 17 is required to be disposed in an area other than an area on the reverse face 6b corresponding to an area of the upper face 6a of the printed circuit board 6 where the choke coil 7 is disposed. On the other hand, the FETs 8 and 9 may be disposed on the lower face 6b of the printed circuit board 6 so as to partly overlap with the area of the lower face 6b corresponding to the area of the upper face 6a where the choke coil 7 is disposed. Such a disposition does not deteriorate the reliability of the self-ballasted fluorescent lamp 50.

While the fluorescent lamp 1 is operated, eletrodes 21 and 22 of the fluorescent lamp 1 have an extremely high temperature of about 1000° C. As a result, a temperature of the fluorescent lamp 1 is about 150° C. or more within a radius of about 10 mm of tube ends in which the electrodes 21 and 22 are sealed.

The FETs 8 and 9 are disposed at a distance of 10 mm or more from the tube ends of the fluorescent lamp 1 in which the electrodes 21 and 22 are sealed. This allows a temperature of the FETs 8 and 9 to be 150° C. or less. In FIG. 3, $d_{21-8} \geq 10$ mm, $d_{21-9} \geq 10$ mm, $d_{22-8} \geq 10$ mm, and $d_{22-9} \geq 10$ mm. Here, $d_{21-8}$ represents a distance between the electrode 21 and the FET 8, $d_{21-9}$ represents a distance between the electrode 21 and the FET 9, $d_{22-8}$ represents a distance between the electrode 22 and the FET 8, and $d_{22-9}$ represents a distance between the electrode 22 and the FET 9.

The inverter driving IC 17 is disposed at a distance of 15 mm or more from the tube ends of the fluorescent lamp 1 in which the electrodes 21 and 22 are sealed. This allows a temperature of the inverter driving IC 17 to be 125° C. or less. In FIG. 3, $d_{21-17} \geq 15$ mm and $d_{22-17} \geq 15$ mm. Here, $d_{21-17}$ represents a distance between the electrode 21 and the inverter driving IC 17, and $d_{22-17}$ represents a distance between the electrode 22 and the inverter driving IC 17.

As described above, according to Example 1, the inverter driving IC 17 is not disposed on a face of the printed circuit board 6 in an area substantially corresponding to an area on an opposite face of the printed circuit board 6 where the choke coil 7, which reaches a high temperature, is disposed. This can reduce an influence of heat generated by the choke coil 7 on the inverter driving IC 17.

The inverter driving IC 17 is disposed positionally away from the FETs 8 and 9. This can reduce an influence of heat generated by the FETs 8 and 9 on the inverter driving IC 17.

The inverter driving IC 17 is also disposed positionally away from the electrodes 21 and 22 of the fluorescent lamp 1. This can reduce an influence of heat generated by the electrodes 21 and 22 of the fluorescent lamp 1 on the inverter driving IC 17.

As described above, by disposing the inverter driving IC 17 which is a heat-sensitive semiconductor component positionally away from the heat generating component, a temperature of the inverter driving IC 17 can be controlled so as not to rise. This can reduce a possibility that a failure in an operation of the ballast circuit 2 is caused by a heat influence of the heat generating component. As a result, reliability of the ballast circuit 2 can be improved, and thus reliability of the entire self-ballasted fluorescent lamp 50 can be improved.

EXAMPLE 2

In Example 2, an example where the choke coil 7, which is a heat generating component, is disposed on the printed circuit board 6 in an area close to one end is described.

Figure 4:
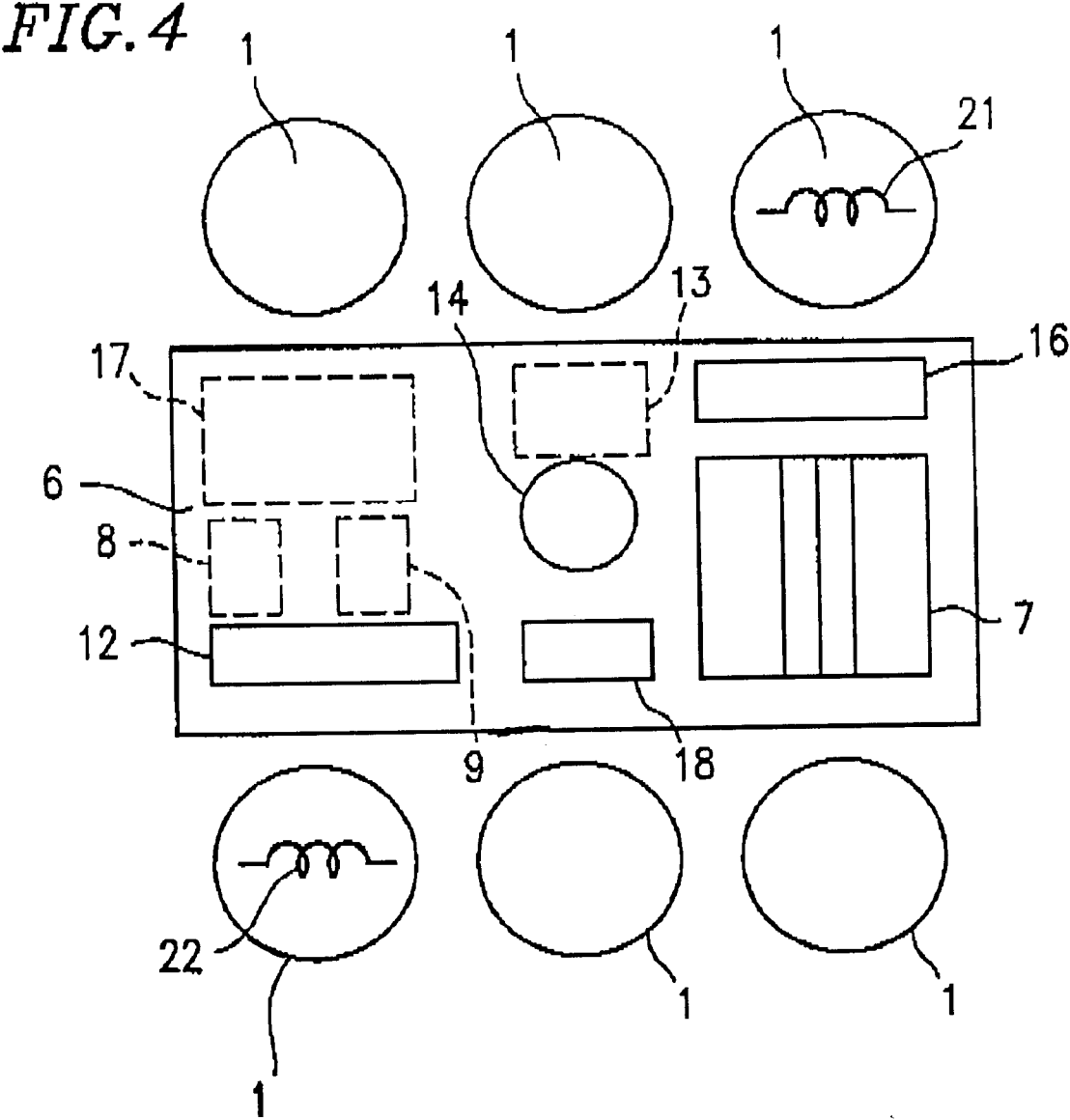
FIG. 4 is a plan view illustrating an example of a positional arrangement of circuit components on the printed circuit board 6.

FIG. 4 illustrates an example of a positional arrangement of circuit components on the printed circuit board 6. In FIG. 4, circuit components represented by the solid lines are disposed on the upper face 6a of the printed circuit board 6 and circuit components represented by the broken lines are disposed on the lower face 6b of the printed circuit board 6.

As illustrated in FIG. 4, the choke coil 7 is disposed on the printed circuit board 6 in an area close to one end and the FETs 8 and 9 and the inverter driving IC 17, which are semiconductor components, are disposed on the printed circuit board 6 in an area close to the other end.

In this manner, by disposing the FETs 8 and 9 and the inverter driving IC 17, which are heat-sensitive semiconductor components, positionally away from the choke coil 7 which is a heat generating component, an influence of heat generated by the choke coil 7 on the FETs 8 and 9 and the inverter driving IC 17 can be kept to a minimum.

There is a case where the line filter circuit 12 includes a large-sized choke coil. In particular, when the self-ballasted fluorescent lamp 50 has a dimming function, the line filter circuit 12 is required to include the large-sized choke coil so as to improve a noise tolerance. As the choke coil becomes larger, a value of resistance becomes greater so that the loss is increased, thereby increasing heat quantity. Accordingly, when the line filter circuit 12 includes the large-sized choke coil, an influence of the heat generated by the line filter circuit 12 also needs to be taken into account.

Figure 5:
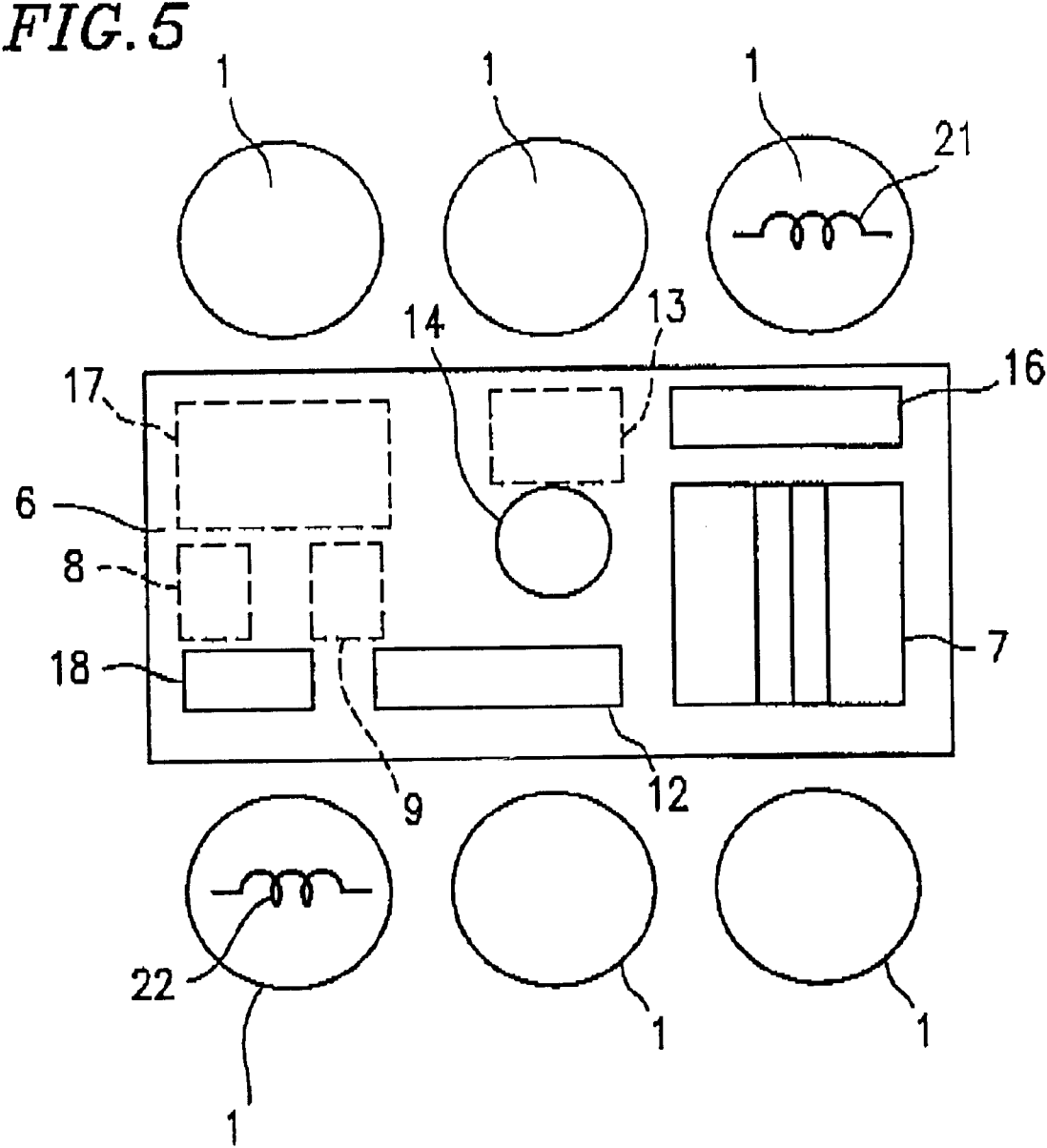
FIG. 5 is a plan view illustrating an example of a positional arrangement of circuit components on the printed circuit board 6.

FIG. 5 illustrates an example of a positional arrangement of circuit components on the printed circuit board 6. The printed circuit board 6 may be preferably used in the case where the line filter circuit 12 includes a large-sized choke coil and quantity of heat generated by the choke coil is large.

In FIG. 5, circuit components represented by the solid lines are disposed on the upper face 6a of the printed circuit board 6 and circuit components represented by the broken lines are disposed on the lower face 6b of the printed circuit board 6.

Even when the line filter circuit 12 includes the large-sized choke coil, quantity of heat generated by the choke coil 7 is greater than quantity of heat generated by the line filter circuit 12. Accordingly, a distance between the inverter driving IC 17 and the choke coil 7 is required to be longer than that between the inverter driving IC 17 and the line filter circuit 12.

As illustrated in FIG. 5, the choke coil 7 in disposed on the printed circuit board 6 in an area close to one end, and the FETs 8 and 9 and the inverter driving circuit 17, which are semiconductor components, are disposed on the printed circuit board 6 in an area close to the other end. The line filter circuit 12 is disposed positionally as far away from the FETs 8 and 9 and the inverter driving IC 17 as possible.

In this manner, by disposing the FETs 8 and 9 and the inverter driving IC 17 which are heat-sensitive semiconductor components positionally away from the choke coil 7, which is a heat generating component, an influence of heat generated by the choke coil 7 on the FETs 8 and 9 and the inverter driving IC 17 can be kept to a minimum. Moreover, by disposing the FETs 8 and 9 and the inverter driving IC 17, which are heat-sensitive semiconductor components, positionally away from the line filter circuit 12, which is a heat generating component, an influence of heat generated by the line filter circuit 12 on the FETs 8 and 9 and the inverter driving IC 17 can be kept to a minimum.

In the same manner as Example 1, it is preferable that the FETs 8 and 9 and the inverter driving IC 17 are disposed positionally away from the electrodes 21 and 22 to such an extent that heat generated by the electrodes 21 and 22 does not affect them.

Examples 1 and 2 described that the fluorescent lamp 1 is formed by connecting three discharge tubes which are substantially U-shaped by bridges. However, a shape of the fluorescent lamp 1 is not limited to this. The fluorescent lamp 1 may have any shape. For example, the fluorescent lamp 1 may have a W-U shape. However, if the shape of the fluorescent lamp 1 is changed, positions of the electrodes 21 and 22 are also changed, so that the FETs 8 and 9 and the inverter driving IC 17 are disposed in different positions.

Examples 1 and 2 described the printed circuit board 6 as having a rectangular shape. However, the shape of the printed circuit board 6 is not limited to this. The printed circuit board 6 may have any shape. For example, the printed circuit board 6 may have a circular shape.

Examples 1 and 2 described the FETs 8 and 9 and the inverter driving IC as examples of semiconductor components. However, any semiconductor component (e.g., a diode, an IC) other than these semiconductor components may be used. By disposing the heat-sensitive semiconductor components positionally away from the heat generating component, it is possible to reduce an influence of heat generated by the heat generating component on the semiconductor components.

Examples 1 and 2 described that the FETs 8 and 9 and the inverter driving IC 17 are disposed on a face of a printed circuit board which is opposite to a face of the printed circuit board where the choke coil 7 is disposed. The FETs 8 and 9 and the inverter driving IC 17 may be disposed on the same face as the face of the printed circuit board where the choke coil 7 is disposed. In this case, radiant heat from the fluorescent lamp 1 is blocked by the printed circuit board. As a result, it is possible to reduce an influence of heat generated by the fluorescent lamp 1 on the FETs 8 and 9 and the inverter driving IC 17.

INDUSTRIAL APPLICABILITY

According to the present invention, a heat generating component, which generates heat when a fluorescent lamp is operated, is disposed on a first face of a printed circuit board, a semiconductor component is disposed on a second face opposite to the first face, and the semiconductor component is disposed in an area other than an area on the second face corresponding to an area of the first face where the heat generating component is disposed. In this manner, by disposing the heat-sensitive semiconductor component positionally away from the heat generating component, a temperature of the semiconductor component can be controlled so as not to rise. This can reduce a possibility that a failure in an operation of a ballast circuit is caused by a heat influence of the heat generating component. As a result, reliability of the ballast circuit can be improved, and thus reliability of the entire self-ballasted fluorescent lamp can be improved.

What is claimed is:

1. A self-ballasted fluorescent lamp, comprising a fluorescent lamp and a ballast circuit for operating the fluorescent lamp, wherein the ballast circuit includes:

a printed circuit board;

a heat generating component disposed on a first face of the printed circuit board, which generates heat when the fluorescent lamp is operated; and a semiconductor component disposed on a second face opposite to the first face of the printed circuit board, and wherein the semiconductor component is disposed in an area other than an area on the second face corresponding to an area of the first face where the heat generating component is disposed, wherein the semiconductor component is an inverter driving IC included in an inverter circuit for operating the fluorescent lamp; and wherein the inverter circuit further includes a first switching element driven by the inverter driving IC and a second switching element driven by the inverter driving IC, the inverter driving IC being disposed positionally away from the first and second switching elements.

2. A self-ballasted fluorescent lamp according to claim 1, wherein the heat generating component is a magnetic circuit component.

3. A self-ballasted fluorescent lamp according to claim 1, wherein the semiconductor component is disposed at a distance of at least 10 mm from a tube end in which an electrode of the fluorescent lamp is provided.

4. A self-ballasted fluorescent lamp, comprising a fluorescent lamp and a ballast circuit for operating the fluorescent lamp, wherein the ballast circuit includes:

a printed circuit board;

a heat generating component disposed on a first face of the printed circuit boa which generates heat when the fluorescent lamp is operated; and a semiconductor component disposed on a second face opposite to the first face of the printed circuit board, and wherein the semiconductor component is disposed in an area other than an area on the second face corresponding to an area of the first face where the heat generating component is disposed, wherein the semiconductor component is an inverter driving IC included in an inverter circuit for operating the fluorescent lamp; and wherein the inverter circuit further includes a first switching element driven by the inverter driving IC and a second switching element driven by the inverter driving IC, the heat generating component is disposed in substantially a central area on the printed circuit board, and an area of the printed circuit board where the inverter driving IC being disposed is located opposite to an area of the printed circuit board where the first and second switching elements are disposed with respect to the area where the heat generating component is disposed.

5. A self-ballasted fluorescent lamp, comprising a fluorescent lamp and a ballast circuit for operating the fluorescent lamp, wherein the ballast circuit includes:

a printed circuit board;

a heat generating component disposed on a first face of the printed circuit board, which generates heat when the fluorescent lamp is operated; and a semiconductor component disposed on a second face opposite to the first face of the printed circuit board, and wherein the semiconductor component is disposed in an area other than an area on the second face corresponding to an area of the first face where the heat generating component is disposed, wherein the semiconductor component is an inverter driving IC included in an inverter circuit for operating the fluorescent lamp; and wherein the inverter circuit further includes a first switching element driven by the inverter driving IC and a second switching element driven by the inverter driving IC, the heat generating component is disposed on the printed circuit board in an area close to one end of the printed circuit board, the inverter driving IC and the first and second switching elements are disposed on the printed circuit board in an area close to the other end of the printed circuit board.

\* \* \* \* \*

UNITED STATES PATENT AND TRADEMARK OFFICE
CERTIFICATE OF CORRECTION

PATENT NO. : 6,577,066 B1  Page 1 of 1
DATED : June 10, 2003
INVENTOR(S) : Satoshi Kominami et al.

It is certified that error appears in the above-identified patent and that said Letters Patent is hereby corrected as shown below:

<u>Column 8,</u>
Line 59, the word "boa" should be -- board --

Signed and Sealed this

Twenty-fifth Day of November, 2003

JAMES E. ROGAN
*Director of the United States Patent and Trademark Office*